April 26, 1932.   H. KREIDEL   1,855,803
NOZZLE FOR LUBRICATING GUNS AND PUMPS
Filed June 7, 1929
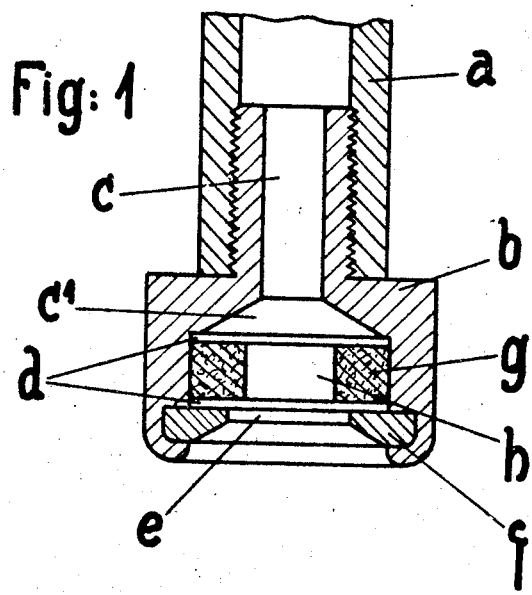
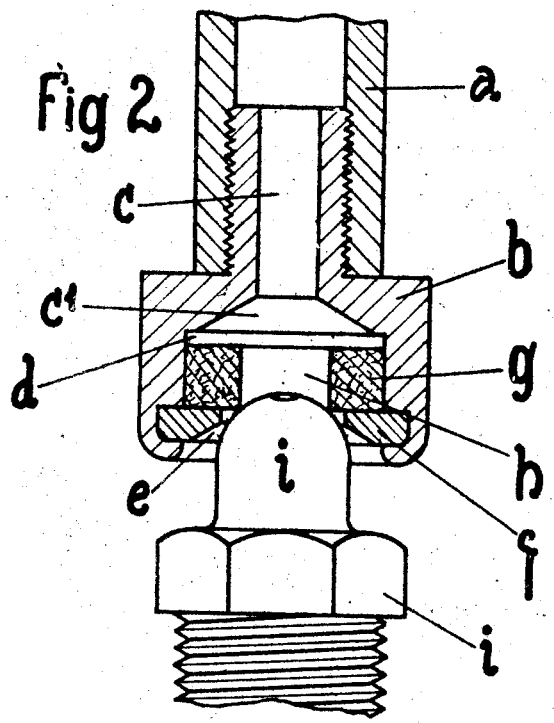
INVENTOR
HANS KREIDEL
BY
ATTORNEYS.

Patented Apr. 26, 1932

1,855,803

UNITED STATES PATENT OFFICE

HANS KREIDEL, OF WIESBADEN, GERMANY

NOZZLE FOR LUBRICATING GUNS AND PUMPS

Application filed June 7, 1929, Serial No. 369,162, and in Germany November 1, 1928.

The present invention relates to a nozzle for a hand lubricating gun, and a hand lubricating pump with a packing member fitted into its enlarged outlet passage, adapted to engage with a rounded lubricating nipple head provided with a non-return valve, and provides further that the packing member is formed of a piston of suitable material provided with a bore and slidably fitted in the cylindrical portion of the nozzle which is provided with an aperture closure cover at its front end, the bore of the piston in axial alignment with the aperture in the cover, but being of smaller diameter than this, whilst the diameter of the aperture in the cover is of smaller diameter than the head of the lubricating nipple so that it is only capable of fitting over a portion of the head of the lubricating nipple. The cylindrical bore in the cover is enlarged outwardly in the form of a funnel so that the lubricating gun or pump can be applied to the lubricating nipple at various angles and separate connecting members with connecting hose or other auxiliary means are not necessary.

In the actuation of the lubricating gun or pump the lubricant which is under high pressure acts firstly upon the piston which slides tightly in the nozzle cylinder and forces this against the head of the nipple with which it forms a tight joint at any angle of applying the lubricating gun or pump, to the nipple. When the packing piston is forced forwardly the nozzle with its cover, closing the cylinder, is slightly withdrawn from the head of the lubricating nipple, with which it first engaged, so that only the inner edge of the bore in the piston comes to bear upon the rounded head of the lubricating nipple and forms a joint therewith.

The new nozzle is simple in construction and production and is efficient in operation. Its packing piston is protected from external influences and injury and is conveniently exchangeable by being unscrewed from the gun to which it is screw-threadedly secured.

In the accompanying drawings is illustrated in longitudinal section one example of construction according to the invention.

Figure 1 shows the position of the packing piston in the nozzle when the lubricating gun or pump is not in operation, and Figure 2 shows the nozzle when the lubricating gun or pump is in the operative position in combination with a lubricating nipple.

$a$ is the front portion of a lubricating gun or pump $b$ is the nozzle which is screwed or otherwise fitted into it, the passage $c$ of the nozzle being connected by a conical enlargement $c^1$ with a cylinder $d$ which at the front is closed by a cover $f$ provided with a central opening $e$. This cover is held in position by rolling over or upsetting the outer rim of the nozzle, but may be secured in position by being screwed into the nozzle. The central opening of the cover is first cylindrical, and is then enlarged towards the outside in the form of a funnel.

Within the cylindrical portion $d$ of the nozzle there is mounted tightly, but capable of sliding a packing piston $g$ of suitable material such as leather, this piston being also provided with a central bore $h$ which however is of somewhat smaller diameter than the bore $e$ in the cover $f$ so that the annular piston $g$ extends slightly inwardly over the cylindrical portion of the opening $h$. The lubricating nipple $i$ is provided with a spherical head and in the apex thereof there is provided a passage for the lubricant which is provided in a well known manner with an automatic non-return valve.

The cylindrical portion of the bore $e$ in the cylinder cover $f$ is of smaller diameter than the spherical head of the lubricating nipple so that the head can only partly enter the bore $e$.

For the purpose of lubrication the lubricating gun or pump is placed with its nozzle against the rounded head of the nipple. The inner edge of the cylindrical portion of the bore $e$ comes into engagement with the outer surface of the rounded nipple head.

The lubricating gun or pump may be applied to the nipple at various angles.

As soon as the pump is operated and the lubricant under high pressure passes through the passage $c$, $c^1$ into the cylinder $d$ it forces the packing piston $g$ outwardly and presses it tightly against the nipple head, whilst the outer edge or the outer portion of the bore $h$ serves to produce a tight joint whilst there is only a slight yielding of the nozzle. The inner edge of the cylindrical portion of the bore $e$ is thus again withdrawn from the head of the nipple (Figure 2). The joint which is obtained is entirely efficient. Wear of the packing surfaces is only very slight as they are not exposed and the packing piston itself can be conveniently exchanged in a simple manner and replaced by another.

Having now particularly described and ascertained the nature of my said invention and in what manner the same is to be performed, I declare that what I claim is:

1. A nozzle for hand lubricating guns having a passageway therein, a sealing member in the form of a round gasket slidably mounted in an enlarged portion of said outlet passage, a fixed closure member in said nozzle overlying the edge of the sealing member and adapted to rigidly seat against a fitting and said sealing member adapted under lubricant pressure to be moved against the lubricant receiving fitting to form a lubricant tight seal.

2. A nozzle for a hand lubricating gun having a passageway therein with an enlarged opening near its end, a seal washer reciprocably mounted in said enlarged opening, a metallic retaining ring overlying the edge of said sealing washer and said retainer having an opening therethrough adapted to contact a spherically headed lubricant fitting and said sealing washer adapted under lubricant pressure to make a lubricant seal with the head of said lubricant fitting.

3. A nozzle for a hand lubricating gun having an enlarged outlet passageway, a packing member located therein for cooperating with the rounded head of a lubricant nipple provided with a non-return valve, said packing member formed as a leather piston and having a central axial bore therethrough, said packing member slidably fitted in a cylindrical portion of the outlet passageway, and a fixed apertured closure cover at the front end of said passageway, said packing member and said closure cover having progressively increasing aperture sizes, and the aperture in the cover formed first cylindrically and then enlarged outwardly in the shape of a funnel.

4. A nozzle for a hand lubricating gun having an enlarged outlet passageway, a packing member located therein for cooperating with the rounded head of a lubricant nipple provided with a non-return valve, said packing member formed as a leather piston and having a central axial bore therethrough, said packing member slidably fitted in a cylindrical portion of the outlet passageway, and a fixed apertured closure cover at the front end of said passageway, said packing member and said closure cover having progressively increasing aperture sizes, the larger of which is of a smaller diameter than the head of the lubricant nipple, and the aperture in the cover formed first cylindrically and then enlarged outwardly in the shape of a funnel.

In testimony whereof I affixed my signature.

HANS KREIDEL.